United States Patent [19]

Ototani et al.

[11] Patent Number: 4,729,787

[45] Date of Patent: Mar. 8, 1988

[54] METHOD OF PRODUCING AN IRON; COBALT AND NICKEL BASE ALLOY HAVING LOW CONTENTS OF SULPHUR, OXYGEN AND NITROGEN

[75] Inventors: Tohei Ototani, Tokyo; Toru Degawa, Kurashiki; Kenichi Kusumoto, Inagi; Makoto Ebata, Tokyo, all of Japan

[73] Assignees: Mitsui Engineering and Ship Building Co., Ltd.; Metal Research Corporation, both of Japan

[21] Appl. No.: 937,426

[22] Filed: Dec. 3, 1986

Related U.S. Application Data

[63] Continuation-in-part of Ser. No. 799,382, Nov. 18, 1985, abandoned.

[30] Foreign Application Priority Data

Apr. 26, 1985 [JP] Japan .............................. 60-90571
Oct. 7, 1985 [JP] Japan .............................. 60-223288

[51] Int. Cl.$^4$ .............................................. C21C 7/02
[52] U.S. Cl. ............................................ 75/58; 75/53; 420/85; 420/129
[58] Field of Search ............... 75/53, 58, 49; 420/85, 420/129

[56] References Cited

U.S. PATENT DOCUMENTS 3,336,132 8/1967 McCoy ................................. 75/49
3,467,167 9/1969 Mahin ................................. 75/58

*Primary Examiner*—Peter D. Rosenberg
*Attorney, Agent, or Firm*—Sughrue, Mion, Zinn, Macpeak, and Seas

[57] ABSTRACT

A method of producing an alloy containing at least one major ingredient selected from the group consisting of iron (Fe), cobalt (Co), and Nickel (Ni) and having low contents of sulphur, oxygen, and nitrogen, comprises steps of:

(a) holding a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive, based on the molten alloy, into said molten alloy in an atmosphere selected from the group consisting of a non-oxidizing atmosphere and a vacuum, wherein said additive is selected from the group consisting of aluminum (Al), aluminum alloys, silicon and silicon alloys;

(c) desulphurizing, deoxidizing and denitrifying said molten alloy under an atmosphere selected from the group consisting of a non-oxidizing atmosphere and a vacuum, whereby the molten alloy contains 0.005 to 7.0% of residual aluminum, 0.0001 to 0.02% of residual calcium, and 0.0005 to 0.03% of residual magnesium; and (d) casting said molten alloy into a mold.

16 Claims, 5 Drawing Figures

METHOD OF PRODUCING AN IRON; COBALT AND NICKEL BASE ALLOY HAVING LOW CONTENTS OF SULPHUR, OXYGEN AND NITROGEN

This is a continuation-in-part of application Ser. No. 799,382, filed Nov. 18, 1985, now abandoned.

BACKGROUND OF THE INVENTION

1. Field of the Invention

This invention relates to a method of producing an iron-, cobalt, or nickel-base alloy of high purity, and more particularly to a method of producing an alloy containing at least one major ingredient selected from the group consisting of iron (Fe), cobalt (Co), and nickel (Ni) and having low contents of sulphur, oxygen, and nitrogen.

2. Related Art Statement

As already known, an iron-, cobalt- or nickel-base alloy is excellent in mechanical property, thermal resistance and corrosion resistance. When residual oxygen and sulphur are excessive, however, the alloy is deteriorated in workability. Therefore, it is important to sufficiently decrease residual oxygen and sulphur.

In general, it has been well-known that calcia (CaO) refractories is stable even at high temperature and used for melting each kind of alloys having high reactivity. When aluminum (Al) or aluminum alloy is added to a molten bath in a vessel or ladle lined with this calcia (CaO) refractory, it has also been well-known that calcia (CaO) is reduced by aluminum (Al) to produce metallic calcium (Ca), and deoxidation and desulfurization is proceeded by said calcium (Ca).

That is, Japanese Patent Publication No. 849/79, Japanese Patent Publication No. 24,688/79 (Japanese Pat. No. 992,541) and Japanese Patent Publication No. 25,486/85 describe a method of deoxidizing and desulphurizing molten steel by adding aluminum or an aluminum alloy to the molten steel in vacuum or in an argon atmosphere with the use of a melting furnace, a crucible or a ladle lined with a basic refractories having high contents of CaO. The essence of this method is to reduce calcium (CaO) in the lined refractories by adding aluminum (Al) and to remove sulphur and oxygen in the molten steel by calcia (Ca) as a reduced product. U.S. Pat. No. 4,484,946 further describes a method of deoxidizing and desulphurizing molten steel, in case of repeatedly using a melting furnace or a crucible lined with said based refractories, wherein as oxysulfide of calcium is accumulated on a wall surface of the melting furnace or the crucible and a deoxidizing rate or a desulphurizing rate of the iron alloy is reduced, an additive such as aluminum together with or without flux is added to the molten steel, thereby preventing said compound from accumulating on the wall surface of the melting furnace, the ladle or the crucible.

According to the above method, it is possible to reduce sulphur in the molten steel to about 0.004% by weight and oxygen in the molten steel to 0.002% by weight. However, it is expected to find a more super refining technique having more higher desulphurization and more deoxidation in the field of refining alloys.

SUMMARY OF THE INVENTION

An object of the present invention is to provide a method of producing an iron-, cobalt-, or nickel-base alloy with lower contents of sulphur, oxygen and nitrogen than those in the above-mentioned prior methods.

To fulfile the above object, an object of the present invention is to provide a method of producing an iron-, nickel-, and cobalt-base alloy having an oxygen content of less than 0.002%, a sulphur content of less than 0.002%, and a nitrogen content of less than 0.03%, comprising steps of:

(a) holding a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive, based on the molten alloy, into said molten alloy in an atmosphere selected from the group consisting of a non-oxidizing atmosphere and a vacuum, wherein said additive is selected from the group consisting of aluminum (Al), aluminum alloys, silicon and silicon alloys;

(c) desulphurizing, deoxidizing and denitrifying said molten alloy under an atmosphere selected from the group consisting of a non-oxidizing atmosphere and a vacuum, whereby the molten alloy contains a 0.005 to 7.0% of residual aluminum, 0.0001 to 0.02% of residual calcium, and 0.0005 to 0.03% of residual magnesium; and (d) casting said molten alloy into a mold.

Another a method of producing an iron-, nickel-, and cobalt-base alloy having an oxygen content of less than 0.003%, a sulphur content of less than 0.010%, and a nitrogen content of less than 0.03%, comprising steps of:

(a) holding a molten alloy in a container selected from the group consisting of a lime crucible, a lime crucible furnace, a converter and a ladle lined with a basic refractory consisting of 15 to 85% calcium oxide (CaO), 15 to 75% of magnesium oxide (MgO), wherein said alloy consists essentially of at least one major ingredient selected from the group consisting of iron (Fe), nickel (Ni), and cobalt (Co);

(b) adding first additives, into said molten alloy in an atmosphere selected from the group consisting of a non-oxidizing atmosphere and a vacuum, wherein said first additive is consisting a composite clad material of a core encased in an aluminum or iron sheath in wire and rod form, said core consisting essentially of at least one element of metallic aluminum, metallic calcium, metallic magnesium, aluminum base alloys, calcium base alloys and magnesium base alloys;

(c) desulphurizing, deoxidizing and denitrifying said molten alloy under an atmosphere selected from the group consisting of a non-oxidizing atmosphere and a vacuum, whereby the molten alloy contains 0.005 to 7.0% of residual aluminum, 0.005 to 7.0% of residual silicon, 0.0001 to 0.005% of residual calcium, and 0.0005 to 0.03% of residual magnesium; and (d) casting said molten alloy into a mold.

Further object of the present invention is to provide a method of producing an iron-, nickel-, and cobalt-base alloy having an oxygen content of less than 0.003%, a sulphur content of less than 0.010%, and a nitrogen content of less than 0.03%, comprising steps of:

(a) charging a molten alloy in a container selected from the group consisting of a lime crucible, a lime crucible furnace and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding first additive and not more than 5% of a flux, based on the molten alloy, into said molten alloy in an atmosphere selected from the group consisting of a non-oxidizing atmosphere and a vacuum, wherein said first additive is consisting a composite clad material of a core encased in an aluminum or iron sheath in wire and rod form, said core consisting essentially of at least one element of metallic aluminum, metallic calcium, metallic magnesium, aluminum base alloys, calcium base alloys and magnesium base alloys and wherein said flux contains at least one compound selected from the group consisting of oxides, silicates, carbonates, carbides and halides of alkali and alkaline earth metals.

Still further object of the present invention is to provide a method of producing an iron-, nickel-, and cobalt-base alloy having an oxygen content of less than 0.003%, a sulphur content of less than 0.010%, and a nitrogen content of less than 0.03%, comprising steps of:

(a) charging a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive and not more than 5% of a flux, based on the molten alloy, into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements, and wherein said flux contains at least one compound selected from the group consisting of oxides, silicates, carbonates, carbides and halides of alkali and alkali earth metals;

(c) desulphurizing, deoxidizing and denitrifying said molten alloy under and atmosphere selected from the group consisting of a non-oxidizing atmosphere and a vacuum, whereby the molten alloy contains a 0.005 to 7.0% of residual aluminum, 0.0001 to 0.005% of residual calcium, and 0.0005 to 0.03% of residual magnesium; and (d) casting said molten alloy into a mold.

Another object of the present invention is to provide a method of producing an iron-, nickel-, and cobalt-base alloy having an oxygen content of less than 0.003%, a sulphur content of less than 0.010%, and a nitrogen content of less than 0.010%, comprising the steps of:

(a) melting an alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements;

(c) desulphurizing, deoxidizing and denitrifying said molten alloy under and an atmosphere selected from the group consisting of a non-oxidizing atmosphere and a vacuum, whereby the molten alloy contains a 0.005 to 7.0% of residual aluminum, 0.0001 to 0.005% of residual calcium, and 0.0005 to 0.03% of residual magnesium; and (d) casting said molten alloy into a mold.

Another object of the present invention is to provide a method of producing an iron-, nickel-, and cobalt-base alloy having an oxygen content of less than 0.003%, a sulphur content of less than 0.010%, and a nitrogen content of less than 0.010%, comprising the steps of:

(a) melting an alloy in a container selected from the group consisting of a lime crucible, a lime crucible furnace, a converter and a ladle lined with a basic refractory consisting of 15–85% of calcium oxide (CaO) and 15–75% of magnesium oxide (MgO), wherein said alloy consists essentially of at least one major ingredient selected from the group consisting of iron (Fe), nickel (Ni), and cobalt (Co);

(b) adding at least one additive and not more than 5% of a flux, based on the molten alloy, into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements, and wherein said flux contains at least one compound selected from the group consisting of oxides, silicates, carbonates, carbides and halides of alkali and alkaline earth metals and alumina ($Al_2O_3$);

(c) desulphurizing, deoxidizing and denitrifying said molten alloy under and an atmosphere selected from the group consisting of a non-oxidizing atmosphere and a vacuum, whereby the molten alloy contains a 0.005 to 7.0% of residual aluminum, 0.0005 to 0.005% of residual calcium, and 0.0005 to 0.03% of magnesium; and (d) casting said molten alloy into a mold.

Another object of the present invention is to provide a method of producing an iron-, nickel-, and cobalt-base alloy having an oxygen content of less than 0.003%, a sulphur content of less than 0.010%, and a nitrogen content of less than 0.010%, comprising the steps of:

(a) holding a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding first and second additives based on the molten alloy, into said molten alloy in an atmosphere selected from the group consisting of a non-oxidizing atmosphere and a vacuum, wherein said first additive is selected from the group consisting of aluminum (Al), and aluminum alloys, wherein said second additive is selected from the group consisting of titanium (Ti), zirconium (Zr), niobium (Nb), boron (B), and rare earth elements;

(c) desulphurizing, deoxidizing and denitrifying said molten alloy under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of residual magnesium; and (d) casting said molten alloy into a mold.

Another object of the present invention is to provide a method of producing an iron- nickel-, and cobalt-base alloy having an oxygen content of less than 0.003%, a sulphur content of less than 0.010%, and a nitrogen content of less than 0.010%, comprising the steps of:

(a) melting an alloy in a container selected from the group consisting of a lime crucible, a lime crucible furnace, a converter and a ladle lined with a basic refractory consisting of at least 40% calcium oxide (CaO), wherein said alloy consists essentially of at least one major ingredient selected from the group consisting of iron (Fe), nickel (Ni), and cobalt (Co);

(b) adding first and second additives and not more than 5% of a flux, based on the molten alloy, into said molten alloy in an atmosphere selected from the group consisting of a non-oxidizing atmosphere and a vacuum, wherein said first additive is selected from the group consisting of aluminum (Al), aluminum alloys, silicon (Si), and silicon alloys, wherein said second additive is selected from the group consisting of titanium (Ti), zirconium (Zr), niobium (Nb), boron (B), and rare earth elements, and wherein said flux contains aluminum oxide ($Al_2O_3$) and at least one compound selected from the group consisting of oxides, silicates, carbonates, carbides and halides of alkali and alkaline earth metals and alumina ($Al_3O_3$);

(c) desulphurizing, deoxidizing and denitrifying said molten alloy under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of magnesium; and (d) casting said molten alloy into a mold.

Another object of the present invention is to provide a method of producing an iron-, nickel-, and cobalt-base alloy having an oxygen content of less than 0.003%, a sulphur content of less than 0.010%, and a nitrogen content of less than 0.010%, comprising the steps of:

(a) charging a molten alloy in a container selected from the group consisting of a lime crucible, a lime crucible furnace, a converter and a ladle lined with a basic refractory consisting of at least 40% calcium oxide (CaO), wherein said alloy consists essentially of at least one major ingredient selected from the group consisting of iron (Fe), nickel (Ni), and cobalt (Co);

(b) adding at least one additive and not more than 5% of a flux, based on the molten alloy, into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B), and rare earth elements, and wherein said flux contains at least one compound selected from the group consisting of oxides, silicates, carbonates, carbides and halides of alkali and alkaline earth metals;

(c) desulphurizing, deoxidizing and denitrifying said molten alloy under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of magnesium; and (d) casting said molten alloy into a mold.

Another object of the present invention is to provide an iron base alloy consisting essentially of 0.005%–7.0% of aluminum, 0.005%–7.0% of silicon, 0.0005%–0.005% of magnesium, 0.0001%–0.005% of calcium, 0.0001%–0.002% of oxygen, 0.0001%–0.002% of sulphur, and 0.0005%–0.003% of nitrogen.

Another object of the present invention is to provide a nickel base alloy consisting essentially of 0.005%–7.0% of aluminum, 0.005%–7.0% of silicon, 0.0005%–0.005% of magnesium, 0.0001%–0.005% of calcium, 0.0001%–0.002% of oxygen, 0.0001%–0.002% of sulphur, and 0.0005%–0.003% of nitrogen.

Another object of the present invention is to provide a cobalt base alloy consisting essentially of 0.005%–7.0% of aluminum, 0.005%–7.0% of silicon, 0.0005%–0.005% of magnesium, 0.0001%–0.005% of calcium, 0.0001%–0.002% of oxygen, 0.0001%–0.002% of sulphur, and 0.0005%–0.003% of nitrogen.

Aluminum clad additive such as Al—Ca clad wire and Ca—Si encased into Al sheath Al—Si clad wire can be used as said additives. The flux can be used together with said additives. The content of said flux is at least one selected from the group consisting of oxides, silicates, carbonates carbides and halides of alkali and alkaline earth metals.

BRIEF DESCRIPTION OF THE DRAWINGS

For a better understanding of the invention, reference is made to the accompanying drawings, in which.

DESCRIPTION OF THE PREFERRED EMBODIMENTS

The above Japanese Patent Laid open No. 58,010/77 describes a method of producing clean steel with low contents of oxygen, sulphur and nitrogen, comprising the steps of melting steel in a melting furnace or a ladle lined with basic refractories containing at least 60% be weight of CaO, adding aluminum (Al) to the molten steel in an argon gas atmosphere or in vacuo so as to reduce CaO in the lining refractories for generating calcium (Ca), whereby the molten steel is deoxidized, desulphurized, and denitrified by the thus generated calcium (Ca), so as to have remaining 0.005–0.06% by weight of Al and 0.001–0.03% weight of Ca in the molten steel, and reducing oxygen to less than 0.003% by weight, sulphur to less than 0.010% by weight, and nitrogen to less than 0.010% by weight.

The present inventors have further tested and examined the above method, and found more stronger deoxidation and desulphurization owing to the generation of magnesium (Mg) other than calcium (Ca) in the molten steel by adding aluminum (Al) or an aluminum alloy in a furnace wall where magnesia (MgO) and calcia (CaO) are coexistent. The present invention is based on the above knowledge.

In an embodiment of the present invention, use is made of a container such as a crucible, a crucible furnace, a converter or a ladle made of or lined with basic refractories containing 15-75% by weight of magnesia (MgO) and 15%-85% by weight of calcia (CaO), and an Fe-base alloy, Co-base alloy or nickel-base alloy is molten in this container. At least one of aluminum (Al) and an aluminum alloy is added to said molten alloy in the container in a non-oxidizing atmosphere such as argon gas, nitrogen gas or helium gas, or in vacuo.

As another embodiment of the present invention, said alloy is previously molten in a commonly used furnace, and this molten alloy is charged or holding into said container. Aluminum (Al) or aluminum alloy is added to the molten alloy in this container in the same manner.

As a further embodiment of the present invention, a container such as a crucible, a converter or a ladle lined with said refractories essentially consisting of CaO and MgO is used instead of said furnace.

In each of the above embodiments, a part of aluminum (Al) added as an additive to the molten alloy in the container is directly bonded with oxygen in the molten alloy in vacuo or a non-oxidizing atmosphere so as to generate Al$_2$O$_3$ for deoxidation, but the other part of aluminum (Al) is reacted with MgO and CaO in the refractory surface in vacuo or a non-oxidizing atmosphere in accordance with the following equations to generate Mg, Ca and Al$_2$O$_3$.

$$3CaO + 2Al \rightarrow 3Ca + Al_2O_3 \quad (1)$$

$$3MgO + 2Al \rightarrow 3Mg + Al_2O_3 \quad (2)$$

More particularly, the molten steel base is in vacuo or a non-oxidizing atmosphere and a proper amount of 15-85% of CaO and of 15-75% of MgO are present in the crucible or the lining of container, so that the reaction of the equation (2) easily proceeds on the right side as shown in the formula (1) and (2). This reaction is considered to be the following complex reaction.

$$3MgO + CaO + 2Al \rightarrow 3Mg + CaO \cdot Al_2O_3 \quad (3)$$

Calcium aluminate mainly consisting of this CaO.Al$_2$O$_3$ has high desulfurizing power, and as a result, the desulphurization of the molten alloy proceeds.

The following reaction also occurs by the presence of titanium (Ti), cerium (Ce) and the like in vacuo or a non-oxidizing atmosphere.

$$CaO + Ti \rightarrow Ca + TiO \quad (4)$$

$$MgO + Ti \rightarrow Mg + TiO \quad (5)$$

$$3CaO + 2Ce \rightarrow 3Ca + Ce_2O_3 \quad (6)$$

$$3MgO + 2Ce \rightarrow 3Mg + Ce_2O_3 \quad (7)$$

In addition to the above reactions, sulphur, oxygen and nitrogen in the molten steel bath are reacted by aluminum (Al), titanium (Ti), cerium (Ce) and the like to be added in the first place as follows.

$$2Al + 3O \rightarrow Al_2O_3 \quad (8)$$

$$Al + N \rightarrow AlN \quad (9)$$

$$Ti + O \rightarrow TiO \quad (10)$$

$$Ti + N \rightarrow TiN \quad (11)$$

$$2Ce + 3O \rightarrow Ce_2O_3 \quad (12)$$

$$2Ce + 3S \rightarrow Ce_2S_3 \quad (13)$$

$$Ce + N \rightarrow CeN \quad (14)$$

In addition, the sulphur, oxygen and nitrogen components remained in the molten bath are removed by magnesium (Mg) and calcium (Ca) reduced and separated in the molten alloy as described above and as shown in the following formulae (16) to (21), and an extremely clean molten steel bath is obtained.

$$Ca + S \rightarrow CaS \quad (16)$$

$$Ca + O \rightarrow CaO \quad (17)$$

$$3Ca + 2n \rightarrow Ca_3N_2 \quad (18)$$

$$Mg + S \rightarrow MgS \quad (19)$$

$$Mg + O \rightarrow MgO \quad (20)$$

$$3Mg + 2N \rightarrow Mg_3N_2 \quad (21)$$

Thus, the deoxidation is carried out by added aluminum (Al), while both the deoxidation and the desulphurization are carried out by the active magnesium (Mg), calcium (Ca) and calcium aluminate (3CaO.Al$_2$O$_3$) generated by the reducing action of Al.

These reactions extremely quickly proceed, and so the desulphurization and deoxidation are almost completed in several minutes after adding aluminum (Al) to the molten steel bath.

Further, the nitrogen content in the molten steel bath is gradually reduced with the lapse of time. This is because nitrogen (N) is separated from the molten steel bath with the evaporation of calcium (Ca), magnesium (Mg) and the like. This denitrifying rate is considerably raised according to the progress of the deoxidation and desulphurization in a non-oxidizing gas or in vacuo atmosphere such as argon gas.

The reason why the melting furnace or the container is composed of or lined with refractories having a composition consisting of 15-75% by weight of MgO and 15-85% by weight of CaO in the present invention will be explained as follows.

Figure 1:
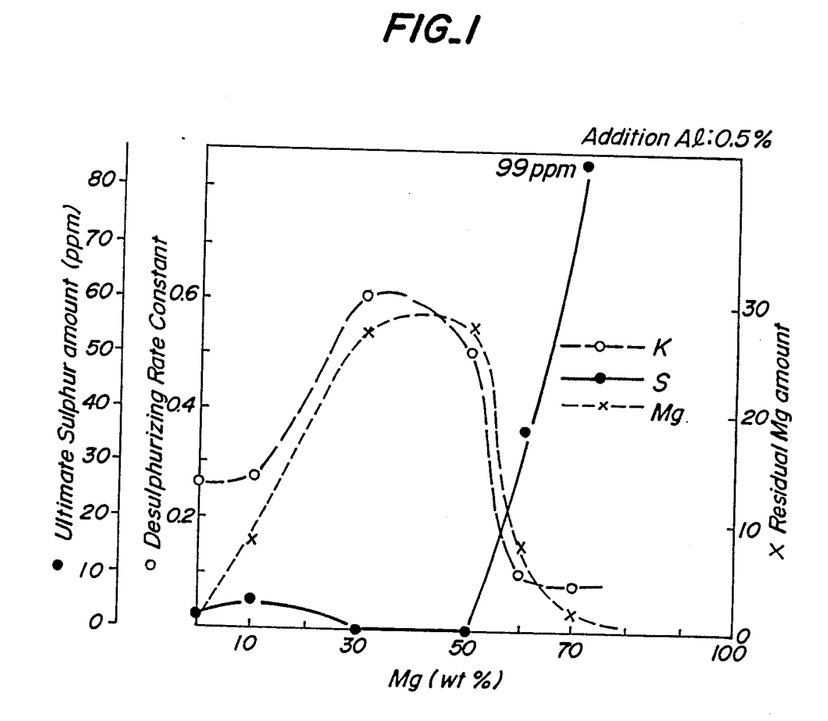
FIG. 1 is a graph showing the relation between MgO contents in a basic refractories of a container, the desulphurizing rate constant (k), the ultimate sulphur amount and residual Mg amount in case of adding 0.5% of metallic aluminum (Al)
Figure 2:
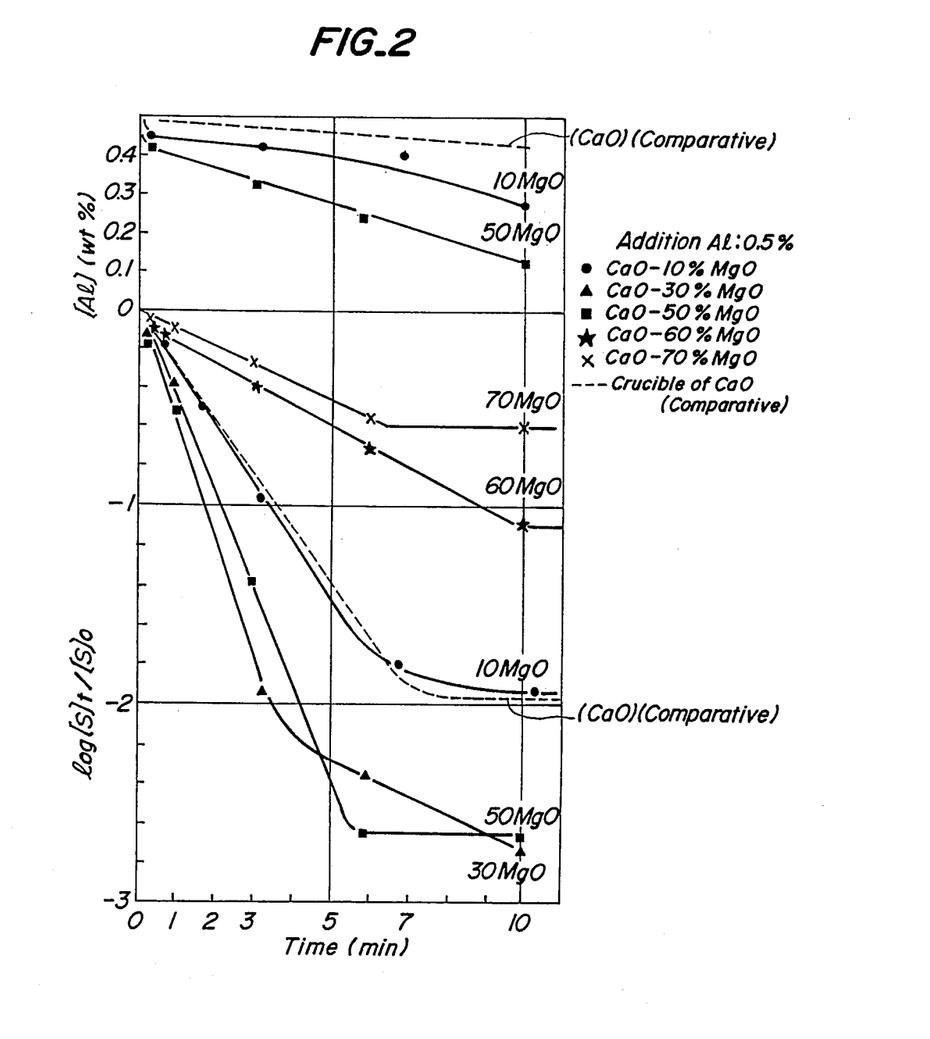
FIG. 2 is a graph showing the time changes of residual aluminum (Al) amount and desulphurization after adding 0.5% of aluminum (Al) in case of respectively using crucibles consisting of basic refractories having different magnesia (MgO) contents and a calcia crucible as comparative.

FIGS. 1 and 2 show desulphurizing properties in the case of an experiment of adding 0.5% of aluminum (Al) to molten steel bath with the use of various different crucibles. log[S]t/[S]o in FIG. 2 is the desulphurizing power, [S]t shows the residual sulphur amount after the time t of 7 minutes, and [S]o shows the initial sulphur amount. As illustrated, in case containing 15-70%, particularly 20-60% of MgO, the extremely strong desulphurization reaction is clearly observed. In addition, FIG. 2 also shows the analysis value (Al wt%) of residual aluminum (Al), but the lowering of the aluminum (Al) amount with the lapse of time after addition is observed, thereby the progress of the above-described reaction of MgO with aluminum (Al) was confirmed.

As a composition of the residue other than MgO, CaO is indispensable. CaO per se is reduced by metallic aluminum to generate an active calcium (Ca), and CaO also accelerates the reducing reaction in MgO by the coexistence with MgO. A preferable containing ratio of CaO is 15%–85% by weight, preferably 40%–80% by weight, of the whole refractories.

When the content of CaO is lower than 40%, calcia (CaO) is less active and hard to be reduced by aluminum (Al) because calcia (CaO) in the refractories is strongly bonded with other oxides. On the other hand, CaO in the refractories containing at least 40% of CaO is largely active and easy to be reduced by aluminum.

Further, the refractories containing at least 40% of CaO easily reacts with oxides such as $Al_2O_3$, $SiO_2$ and the like so as to absorb the oxides in the molten steel bath and to reduce the amount of the oxide inclusions by a large margin. Moreover, such refractories is highly stable with respect to carbon (C), titanium (Ti), zirconium (Zr) and the like and it is possible to melt an alloy at high temperature in the presence of said metals.

As refractory materials according to the present invention, use is preferably made of CaO- or MgO-rich dolomite refractories (CaO.MgO) and the like.

In case of carrying out the present invention, it is preferable to add at least one element selected from the group consisting of boron (B), alkali metal and alkaline earth metal together with aluminum (Al) to the molten bath. As alkali metal, mention may be made of Na, K and Li.

Metallic calcium (Ca), boron (B), sodium (Na), potassium (K), and lithium (Li) added to the molten bath become CaO, $B_2O_3$, $Na_2O$, $K_2O$, and $Li_2O$, and these oxides form the following low-melting point compositions and deoxidizing and desulphurizing rates in the refractory wall is increased thereby.

$Al_2O_3$—CaO—$B_2O_3$ $Al_2O_3$—CaO—$B_2O_3$—$Na_2O$ $Al_2O_3$—CaO—$B_2O_3$—$K_2O$

That is, the oxides of Ca, B, Na, K, Li and the like bond with a calcium aluminate composition such as CaO.MgO already formed on the furnace wall surface and generate a low-melting point composition. Compounds, atoms or their ions (such as $S^{2-}$ and the like) in the molten alloy are easily dispersed in this composition, so as to accelerate the deoxidizing and desulphurizing reactions.

The oxides of CaO, $B_2O_3$ and alkali metal, particularly $B_2O_3$ and alkali metal oxide lower the melting point of a slag and also lower its viscosity when said metallic oxide is taken into slag. Whereby, a diffusion coefficient of ions such as $S^{2-}$, other atoms and compounds in the molten alloy to said slag becomes large. Therefore, the desulphurizing rate is raised and the desulphurizing power is improved by a large margin.

In case of carrying out the present invention, it is preferably to add the following metals in the manufactured Fe-, Co-, or Ni-base alloy so as to be remained therein as follows.

Residual aluminum (Al): 0.005–7% by weight
Residual magnesium (Mg): 0.0005–0.005% by weight
Residual calcium (Ca): 0.0001–0.005% by weight
Total residual amount of at least one element of alkaline earth metals other than magnesium (Mg) and calcium (Ca): 0.001–10% by weight The reason why the residual amount of aluminum (Al) in the alloy is preferably within the range of 0.005–7% by weight is because if the residual amount of Al is less than 0.005%, it is impossible to carry out sufficient deoxidation and calcium (Ca) is scarcely generated, and as a result, the desulphurization, deoxidation and denitrification by calcium (Ca) is hardly carried out, and the residual calcium amount in the finished alloy as the basis for carrying out sufficient desulphurization, deoxidation and denitrification by calcium (Ca) is at least 0.0001%. On the other hand, the obtained alloy containing more than 7% of aluminum as an upper limit is poor in utilization.

If the residual amount of boron (B) is less than 0.001%, boron (B) is less effective, while if the residual amount of boron (B) is more than 10.0%, the obtained alloy becomes brittle. The particularly preferable residual amount of boron (B) is 0.005–3%.

In case of adding aluminum (Al), boron (B), alkali metal and alkaline earth metal to the molten steel bath, it is preferably to add said molten steel bath either as an alloy form or a simple substance, and there is no particular limitation in the form of addition.

Aluminum (Al) and boron (B) can be added as simple substance metal, but alkali metal and alkaline earth metal are preferably added in the form of an alloy because these metals are highly reactive and have a problem in handling. In either case of simple substance metal or alloy, it is possible to add in various forms of a linear body, a rod body, a block or a power body. As an example, it is possible to use an Al—Ca clad wire or Ca—S: clad wire encased into Al sheath.

The residual amount of Mg and Ca of an alloy obtained by a method according to the present invention are 300–1 ppm, preferably 30–5 ppm of magnesium (Mg), and 200–1 ppm, preferably 100–5 ppm of calcium (Ca). If the residual amounts of magnesium (Mg) and calcium (Ca) are too small, deoxidation, desulphurization and denitrification effects are low, while the amount are too excessive, the alloy becomes disadvantageously brittle.

In the present invention, it is further preferable to add a rare earth element to the molten steel bath within the range of less than 200 ppm to the alloy obtained so as to remain the rare earth element therein.

In a preferred embodiment of the present invention, a flux of less than 5% containing at least one of oxides, carbonates, halides, carbides and aluminas of alkali metal and alkaline earth metal and alumina may be added. This adding effect is entirely the same as that of the invention described in U.S. Pat. No. 4,484,946, in which the container can repeatedly be used and the oxy-sulfide is prevented from adhering to the wall surface and from accumulating and contaminating thereof.

The present invention will be more fully explained with reference to the following examples.

EXAMPLE 1

Starting material of 500 g of electrolyte iron consisting of a composition shown in Table 2 and previously adding FeS to make a sulphur component about 0.02% was charged in a CaO crucible consisting of a composition shown in Table 1, this crucible was placed in a 50

KHz high frequency melting furnace, and said material was melted.

Figure 3:
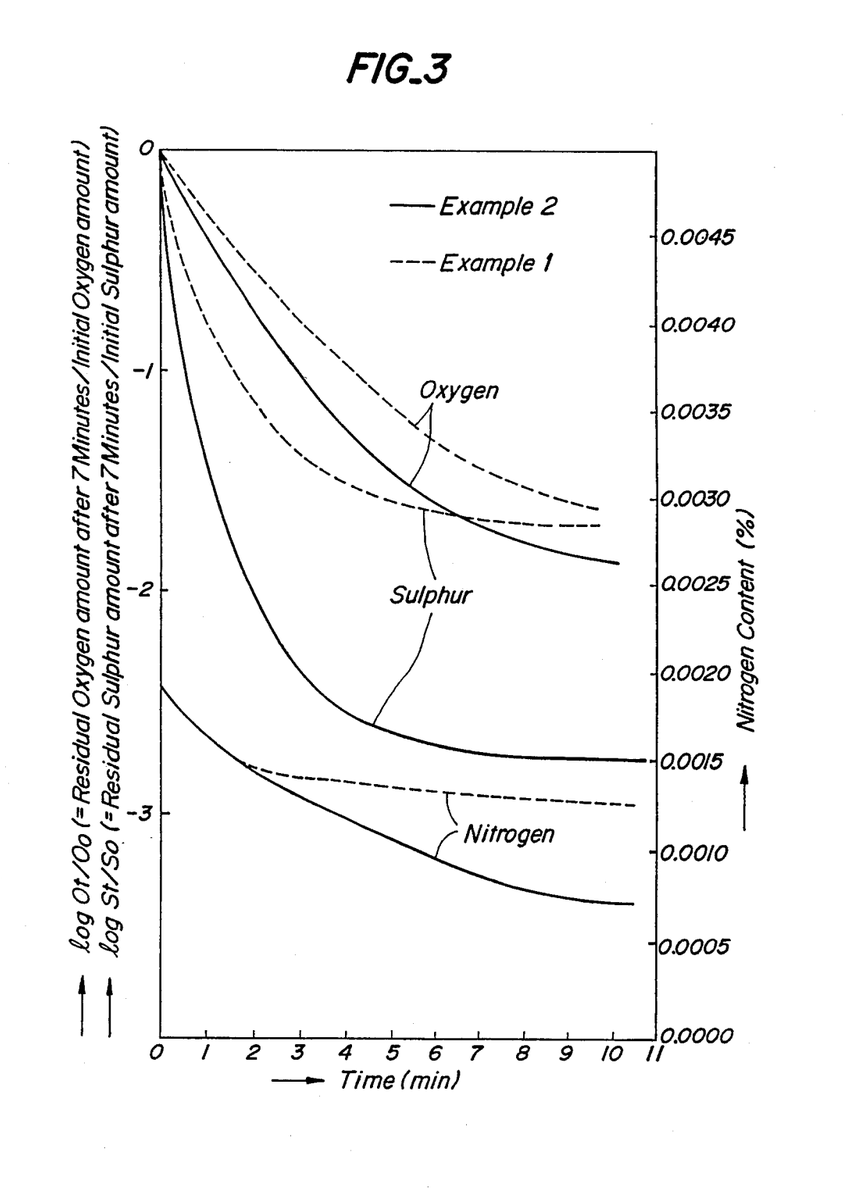
FIG. 3 is a graph showing the time changes of deoxidation, desulphurization and nitrogen contents in a molten alloy in Examples 1 and 2.

After melting, argon gas was introduced into the furnace and 0.4% by weight of an Al alloy was added to the molten steel bath. After adding of aluminum, a sample was absorbed and collected from the molten steel bath by every predetermined time, and each content of oxygen, sulphur and nitrogen was measured. The deoxidation power $\log[O]t/[O]o$, wherein $[O]t$ shows a residual oxygen content after t minutes and $[O]o$ shows an initial oxygen content, the desulphurization power $\log[S]t/[S]o$, and the time change of the nitrogen content are shown in FIG. 3, wherein $[S]t$ shows a residual sulphur content after t minutes and $[S]o$ shows an initial sulphur content.

In addition, the CaO crucible used was prepared by using CaO of a class first reagent as raw material, grinding CaO into 20 mesh, thereafter stamping, shaping and hardening in the crucible, and calcining the thus hardened crucible in an electric resistance furance at about 900° C. for 24 hours.

TABLE 1

| Crucible Composition | |
|---|---|
| Component | Composition (wt %) |
| CaO | >98 |
| $SiO_2$ | <0.5 |
| $Al_2O_3$ | <0.2 |
| $Fe_2O_3$ | <0.5 |
| $P_2O_5$ | <0.02 |
| MgO | <0.5 |

TABLE 2

| Electrolyte Iron Composition (wt %) | |
|---|---|
| Component | Content |
| C | ≦0.005 |
| S | ≦0.002 |
| P | ≦0.004 |
| Si | ≦0.004 |
| Mn | ≦0.004 |
| Cu | ≦0.004 |

EXAMPLE 2

An experiment was conducted in the same manner as in Example 1 except the use of an MgO—CaO crucible consisting of a composition shown in Table 3 prepared by using MgO and CaO of a class first reagent as raw material. The result is shown in Table 3.

TABLE 3

| Crucible Material Composition | |
|---|---|
| Component | Composition (%) |
| CaO | 70.6 |
| MgO | 28.6 |
| $SiO_2$ | <0.5 |
| $Al_2O_3$ | <0.5 |
| $Fe_2O_3$ | <0.5 |

It is understood from FIG. 3 that the molten steel bath having less contents of oxygen, sulphur and nitrogen is quickly obtained and the desulphurization effect according to the method of the present invention is so large.

EXAMPLE 3

An experiment was conducted in the same manner as in Example 1 except that an addition amount of Al was 0.5% and MgO content is variously changed from 10% to 70%.

The desulphurization characteristics and the measurement result of the residual aluminum amount of samples with the use of crucibles having different compositions of Mgo and CaO are shown in FIGS. 1 and 2.

In addition, FIG. 2 also shows the measurement result in Example 1.

It is understood from FIGS. 1 and 2 that the remarkable desulphurization effect can be obtained within the range of 15-70% of MgO and 15-85% of CaO as described above.

Thus, the alloy obtained by the method of the present invention is an extremly purified alloy consisting of less than 15 ppm, particularly less than 10 ppm of sulphur, less than 7 ppm, particularly less than 15 ppm of oxygen, and less than 30 ppm, particularly 20 ppm of nitrogen.

As described above, according to the present invention, in the manufacture of an Fe-, Co-, and Ni-base alloy, extremely strong deoxidation, desulphurization and dentrification can be carried out, thereby manufacturing a considerably excellent alloy having extremely low content of O, N and S, and having various extremely excellent properties in such as creep strength, heat resistance, toughness, weldability and forgeability. There is also almost no inclusion of oxides.

In the above explanation of the present invention, "non-oxidizing atmosphere" means an atmosphere in case of treating a molten bath by blowing a non-oxidizing gas such as argon gas, nitrogen gas or helium gas into the molten steel bath in an open furnace or a closed furnace or by forming the non-oxidizing gas atmosphere on the surface of the molten steel bath to cover the surface of the molten steel bath in the closed furnace with such non-oxidizing gas.

The alloys aimed at by the method of the present invention are Fe-, Co- and Ni-base alloys as described above.

As Fe-base alloys, typical alloy steels are carbon steel of less than 2% of carbon general and further containing common elements of silicon (Si), manganese (Mn), phosphorous (P) and sulphur (S) and alloy steel containing not only special elements of nickel (Ni), chromium (Cr), cobalt (Co), tungsten (W), molybdenum (Mo), aluminum (Al) and titanium (Ti) but also those that belong to the common element but add for particular properties by exceeding the containing range of the common element in addition to the above common elements. As low alloy steel; mention may be made of high-strength low alloy steel, high-temperature high-pressure low alloy steel and low alloy steel for petroleum industry, as medium alloy steel; mention may be made of chrome steel, nickel steel and the like, and as high alloy steel; mention may be made of high chromium stainless steel, high chrome-nickel stainless steel and the like.

A nickel-base alloy contains nickel as a main ingredient, heat-resisting and corrosion-resisting alloy, magnetic alloy and the like are generally classified into this class. The alloys belonging thereto are illustrated as Ni—Cu alloy (Monel metal), Ni—Cr—Fe alloy (Inconel), Ni—Mo alloy (Hastelloy A, B), Ni—Mo—Cr—W alloy (Hastelloy C), Ni—Si alloy (Hastelloy D), Ni—Ta alloy and the like.

A Co-base alloy contains Co as a main ingredient, which is heat-resistant alloy, corrosion-resistant alloy, super alloy, magnetic alloy and the like. The alloys belonging thereto are illustrated as Co—Cr—W—C alloy (Stellite), Co—Fe alloy (Ductile cobalt alloy), Co—Cr—Ni—Mo alloy (Eligiloy alloy), Co—Cr—Ni—W alloy (Hayness), Co alloy for magnetic material such as Vicalloy, Renendur, Permendur and the like, or Co-base super alloy with the aid of separation of Ni₃Ti.

EXAMPLES 4-9

In a CaO crucible (Example 4) and a CaO—MgO crucible (Examples 5-9) consisting of the compositions shown in Table 4 was charged 500 g of electrolyte iron consisting of the composition shown in Table 4 with the previous addition of FeS to make a sulphur content of about 0.03% (300 ppm) as a starting material, the crucible was placed in a high frequency melting furnace and said material was melted in the crucible.

Figure 4:
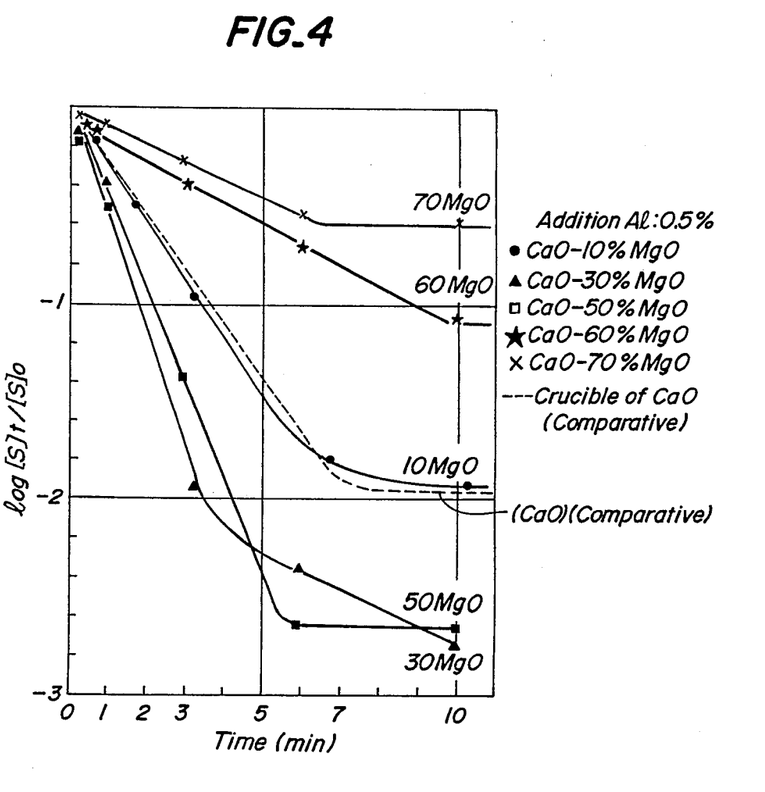
FIG. 4 is a characteristic graph showing the time changes of desulphurization rate of log[S]t/[S]o in case of adding 0.5% of aluminum into a molten steel base charged into a crucible having different magnesiacalcia (MgO—CaO) contents in magnesia-calcia crucible and a calcia crucible (as comparative)

After melting, as argon gas was introduced into the furnace, 0.5% by weight of an aluminum (Al) alloy was added to the molten iron alloy. After adding of aluminum, a sample was absorbed and collected from the molten iron alloy by each predetermined time, and each content of oxygen, sulphur and nitrogen was measured. In FIG. 4 are shown in the deoxidation power log [O]t/[O]o, wherein [O]t is a residual oxygen amount after t minutes, and [O]o is an initial oxygen amount, the sulphurization power log [S]t/[S]o and the time change of the nitrogen content.

FIG. 4 shows as example of using a CaO—MgO crucible prepared by adding 10% of MgO, 30% of MgO, 50% of MgO, 60% of MgO and 70% of MgO to a calcia (CaO) crucible with the addition of 0.5% of aluminum (Al) for melting sample in said crucible and [S]o being the initial sulphur amount of 300 ppm.

Further, the CaO—MgO crucible used was manufactured by using CaO and MgO of a common reagent as a raw material, grinding the raw material into 20 mesh, sufficiently hardening it in the form of crucible, and calcining the hardened crucible in an electric resistance furnace at about 900° C. for 24 hours.

Table 4 shows the desulphurization rate constant and the residual element amount by retaining the aluminum (Al) addition amount at 0.5% and variously changing the MgO content in the crucible material from 10% to 70%. The desulphurization rate constant becomes large when the crucible material is 30% and 50%.

Figure 5:
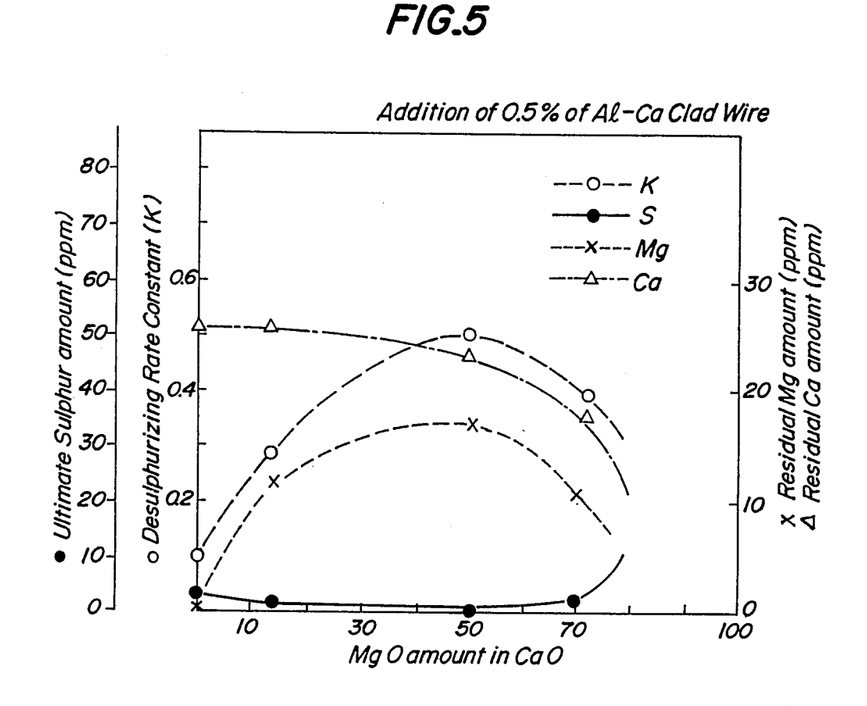
FIG. 5 is a characteristic graph showing the relation between the different magnesia (MgO) content in CaO—MgO crucible and the desulphurizing rate constant (k), the ultimate sulphur amount and the residual magnesium amount (Mg), the residual calcium amount (Ca) in case of adding 0.5% of Al—Ca clad wire.

FIG. 5 shows the relation of the MgO mixing amount, the desulphurization ultimate value, the residual Mg amount, and the desulphurization rate constant when 0.5% of Al—Ca clad wire was added.

TABLE 4

| | Desulphurization rate constant and residual element amount after adding 0.5 wt % of Al | | | | | | |
|---|---|---|---|---|---|---|---|
| Example | Crucible material | Desulphurization rate constant | Analytical value 10 minutes after adding Al (ppm) | | | | |
| | | | S | O | N | Mg | Ca | Al |
| 4 | CaO | 0.26 | 2 | 8 | 12 | <1 | 6 | 0.45 |
| 5 | CaO—10 MgO | 0.27 | 3 | 6 | 10 | 8 | 8 | 0.27 |
| 6 | CaO—30 MgO | 0.60 | n.d | 7 | 8 | 27 | 8 | 0.25 |
| 7 | CaO—50 MgO | 0.52 | n.d | 9 | 10 | 28 | 7 | 0.13 |

TABLE 4-continued

| | Desulphurization rate constant and residual element amount after adding 0.5 wt % of Al | | | | | | |
|---|---|---|---|---|---|---|---|
| Example | Crucible material | Desulphurization rate constant | Analytical value 10 minutes after adding Al (ppm) | | | | |
| | | | S | O | N | Mg | Ca | Al |
| 8 | CaO—60 MgO | 0.10 | 21 | 10 | 22 | 7 | 3 | 0.30 |
| 9 | CaO—70 MgO | 0.09 | 50 | 12 | 24 | 10 | 2 | 0.42 |

As shown in Table 5, the molten metal is prepared by melting a residual sulphur of 300 ppm with electrolyte iron, and the molten iron as charged into a CaO—MgO crucible which is prepared by adding 15% of MgO, 50% of MgO and 70% of MgO to CaO crucible, an Al—Ca clad wire cladded a core material consisting of 0.3 wt% of Al and 0.2 wt% of Ca was added into the molten iron, then the molten iron was deoxidized, desulphurized and denitrified for 10 minutes. The sulphurization rate constant and analytical values (ppm) of each element are shown in Table 5.

$$\text{desulphurization rate constant } k = \frac{\log[S]e/[S]o}{[T]e}$$

[S]o: initial sulphur amount,
[S]e: equilibirium sulphur amount, and
[T]e: time up to equilibrium.

TABLE 5

| | Desulphurization rate constant and residual element amount after adding 0.5 wt % of Al—Ca clad wire (Al 0.3, Ca 0.2 wt %) | | | | | | |
|---|---|---|---|---|---|---|---|
| Example | Crucible material | Desulphurization rate constant | Analytical value 10 minutes after adding Al—Ca clad wire (ppm) | | | | |
| | | | S | O | N | Mg | Ca | Al |
| 7 | CaO | 0.10 | 3 | 9 | 10 | 1 | 25 | 0.15 |
| 8 | CaO—10 MgO | 0.27 | 2 | 8 | 9 | 12 | 25 | 0.13 |
| 9 | CaO—50 MgO | 0.51 | 1 | 6 | 7 | 16 | 23 | 0.10 |
| 10 | CaO—20 MgO | 0.41 | 2 | 7 | 8 | 10 | 18 | 0.13 |

FIG. 5 shows the relation of the mixing amount of MgO in CaO crucible, the desulphurization ultimate value, the desulphurization rate constant, the residual amount of magnesium (Mg) and the residual amount of calcium (Ca) in case of adding 0.5% of Al—Ca clad wire having a composition of 0.3% of Al and 0.2% of Ca.

EXAMPLES 14-16

The molten metal was Hastelloy X consisting essentially of 22% of Cr, 2% of Co, 18% of Fe, 9% of Mo and 0.5% of W. The crucible material of CaO-50% MgO was used. 0.2 wt% of aluminum (Al) as an addition element was added to the molten metal. In Examples 14 and 15, 100 g of a flux having a CaO—CaF₂—Al₂O₃ ratio of 6:3:1 was added, and 2 Kg of metal was dissolved. In Table 6 is shown the flux adding effect in case of repeatingly using the crucible for melting said alloy.

TABLE 6

| Example | Number of repeating use | Flux | Flux adding effect in case of repeatingly using crucible (CaO—50% MgO crucible) | | | | | Remarks |
|---|---|---|---|---|---|---|---|---|
| | | | Residual element amount (wt %) (*ppm) | | | | | |
| | | | Carbon | Aluminum | Sulfur* | Oxygen* | Nitrogen* | |
| 14 | First time | CaO—Ca$_2$—Al$_2$O$_3$ (6:3:1) | 0.11 | 0.12 | n.d. | 8 | 14 | added Al:0.2% |
| 15 | Fifth time | CaO—CaF$_2$—Al$_2$O$_3$ (6:3:1) | 0.10 | 0.11 | 1 | 7 | 16 | added Al:0.2% |
| 16 | Fifth time No flux | Adding no flux | 0.14 | 0.18 | 62 | 25 | 52 | added Al:0.2% |

Example 14 shows the addition of a flux at the first time of the number of repeating use of the crucible for melting the alloy, Example 15 shows the case of addition of a flux at the fifth time, and Example 16 shows the case of repeating use of a flux up to the fifth time and thereafter adding no flux.

Table 7 shows the composition of a high-purity calcia (CaO) crucible used, and Table 8 shows the composition of high-purity magnesia (MgO) used for mixing into the calcia crucible.

TABLE 7

| High-Purity CaO Composition used | |
|---|---|
| Component | Composition (wt %) |
| CaO | >98 |
| SiO$_2$ | <0.5 |
| Al$_2$O$_3$ | <0.2 |
| Fe$_2$O$_3$ | <0.5 |
| P$_2$O$_5$ | <0.02 |
| MgO | <0.5 |

TABLE 8

| High-Purity MgO Composition used for Mixing | |
|---|---|
| Component | Composition (wt %) |
| MgO | 99.2 |
| CaO | 0.46 |
| SiO$_2$ | 0.18 |
| Fe$_2$O$_3$ | 0.04 |
| Al$_2$O$_3$ | 0.04 |
| B$_2$O$_3$ | 0.03 |

Table 9 shows the electrolyte iron composition (wt%) used.

TABLE 9

| Electrolyte Iron Composition (wt %) used | |
|---|---|
| Component | Content |
| C | ≦0.005 |
| S | ≦0.002 |
| P | ≦0.004 |
| Si | ≦0.004 |
| Mn | ≦0.004 |
| Cu | ≦0.004 |
| Fe | rest |

Analytical value after melting and before adding Al

| S: 300 ppm ... adjusted by adding FeS |
| O: 300 ppm ⎫ as they are |
| N: 40 ppm ⎭ |

Although the invention has been described with a certain degree of particularity, it is understood that the present disclosure has been made only by way of example, and that numerous changes in details of construction and the combination and arrangement of parts may be resorted to without departing from the scope of the invention as hereinafter claimed.

What is claimed is:

1. A method of producing an iron-, nickel-, and cobalt-base alloy having an oxygen content of less than 0.002%, a sulphur content of less than 0.002%, and a nitrogen content of less than 0.03%, comprising the steps of:
  (a) holding a molten alloy in a container selected from the group consisting of a lime crucible, a lime crucible furnace, a converter and a ladle lined with a basic refractory consisting of 15–85% of calcium oxide (CaO) and 15–75% of magnesium oxide (MgO), wherein said alloy consists essentially of at least one major ingredient selected from the group consisting of iron (Fe), nickel (Ni), and cobalt (Co);
  (b) adding at least one additive into said molten alloy in an atmosphere selected from the group consisting of a non-oxidizing atmosphere and a vacuum, wherein said additive is selected from the group consisting of aluminum (Al) and aluminum alloys;
  (c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0001 to 0.02% of residual calcium, and 0.0005 to 0.03% of residual magnesium; and
  (d) casting said molten alloy into a mold.

2. A method of producing an iron-, nickel-, and cobalt-base alloy as claimed in claim 1, wherein the molten alloy before casting contains 0.005 to 7% of residual aluminum, 0.005% to 7% of residual silicon, 0.0001 to 0.005% of residual calcium, and 0.0005 to 0.005% of residual magnesium.

3. A method of producing an iron-, nickel-, and cobalt-base alloy having an oxygen content of less than 0.003%, a sulphur content of less than 0.010%, and a nitrogen content of less than 0.03%, comprising steps of:
  (a) holding a molten alloy in a container selected from the group consisting of a lime crucible, a lime crucible furnace, a converter and a ladle lined with a basic refractory consisting of 15 to 85% calcium oxide (CaO), 15 to 75% of magnesium oxide (MgO), wherein said alloy consists essentially of at least one major ingredient selected from the group consisting of iron (Fe), nickel (Ni), and cobalt (Co);
  (b) adding first additives, into said molten alloy in an atmosphere selected from the group consisting of a non-oxidizing atmosphere and a vacuum, wherein said first additive is consisting a composite clad material of a core encased in an aluminum or iron sheath in wire and rod form, said core consisting essentially of at least one element of metallic aluminum, metallic calcium, metallic magnesium, aluminum base alloys, calcium base alloys and magnesium base alloys;

(c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.005 to 7.0% of residual silicon, 0.0001 to 0.005% of residual calcium, and 0.0005 to 0.03% of residual magnesium; and (d) casting said molten alloy into a mold.

4. A method of producing an iron-, nickel-, and cobalt-base alloy having an oxygen content of less than 0.003%, a sulphur content of less than 0.010%, and a nitrogen content of less than 0.03%, comprising the steps of:

(a) charging a molten alloy in a container selected from the group consisting of a lime crucible, a lime crucible furnace and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding first additive and not more than 5% of a flux into said molten alloy in an atmosphere selected from the group consisting of a non-oxidizing atmosphere and a vacuum, wherein said first additive consists of a composite clad material of a core encased in an aluminum or iron sheath in wire and rod form, said core consisting essentially of at least one element of metallic aluminum, metallic calcium, metallic magnesium, aluminum base alloys, calcium base alloys and magnesium base alloys and wherein said flux contains at least one compound selected from the group consisting of oxides, silicates, carbonates, carbides and halides of alkali and alkaline earth metals; and (c) desulphurizing, deoxidizing and denitrifying said molten alloy in the presence of aluminum, calcium and magnesium.

5. A method of producing an iron-, nickel-, and cobalt-base alloy having an oxygen content of less than 0.003%, a sulphur content of less than 0.010%, and a nitrogen content of less than 0.03%, comprising the steps of:

(a) charging a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and colbalt (Co);

(b) adding at least one additive and not more than 5% of a flux into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements, and wherein said flux contains at least one compound selected from the group consisting of oxides, silicates, carbonates, carbides and halides of alkali and alkali earth metals;

(c) desulphurizing, deoxidizing an denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.03% of residual magnesium; and (d) casting said molten alloy into a mold.

6. A method of producing an iron-, nickel-, and cobalt-base alloy having an oxygen content of less than 0.003%, a sulphur content of less than 0.010%, and a nitrogen content of less than 0.010%, comprising the steps of:

(a) melting an alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements;

(c) desulphurizing, deoxidizing and denitrifying said molten alloy in the presence of aluminum, calcium and magnesium under an atomosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.03% of residual magnesium; and (d) casting said molten alloy into a mold.

7. A method of producing an iron-, nickel-, and cobalt-base alloy having an oxygen content of less than 0.003%, a sulphur content of less than 0.010%, and a nitrogen content of less than 0.010%, comprising the steps of:

(a) melting an alloy in a container selected from the group consisting of a lime crucible, a lime crucible furnace, a converter and a ladle lined with a basic refractory consisting of 15–85% of calcium oxide (CaO) and 15–75% of magnesium oxide (MgO), wherein said alloy consists essentially of at least one major ingredient selected from the group consisting of iron (Fe), nickel (Ni), and cobalt (Co);

(b) adding at least one additive and not more than 5% of a flux into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B) and rare earth elements, and wherein said flux contains at least one compound selected from the group consisting of oxides, silicates, carbonates, carbides and halides of alkali and alkaline earth metals and alumina ($Al_2O_3$);

(c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0005 to 0.005% of residual calcium, and 0.0005 to 0.03% of magnesium; and (d) casting said molten alloy into a mold.

8. A method of producing an iron-, nickel-, and cobalt-base alloy having an oxygen content of less than 0.003%, a sulphur content of less than 0.010%, and a nitrogen content of less than 0.010%, comprising the steps of:

(a) holding a molten alloy in a container selected from the group consisting of a lime crucible a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and colbalt (Co);

(b) adding first and second additives into said molten alloy in an atmosphere selected from the group consisting of a non-oxidizing atmosphere and a vacuum, wherein said first additive is selected from the group consisting of aluminum (Al), and aluminum alloys, wherein said second additive is selected from the group consisting of titanium (Ti), zirconium (Zr), niobium (Nb), boron (B), and rare earth elements;

(c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of residual magnesium; and (d) casting said molten alloy into a mold.

9. A method of producing an iron- nickel-, and cobalt-base alloy having an oxygen content of less than 0.003%, a sulphur content of less than 0.010%, and a nirogen content of less than 0.010%, comprising the steps of:

(a) melting an alloy in a container selected from the group consisting of a lime crucible, a lime crucible furnace, a converter and a ladle lined with a basic refractory consisting of 15–75% magnesium oxide (MgO) and 15–85% of calcium oxide (CaO), wherein said alloy consists essentially of at least one major ingredient selected from the group consisting of iron (Fe), nickel (Ni), and colbalt (Co);

(b) adding first and second additives and not more than 5% of a flux into said molten alloy in an atmosphere selected from the group consisting of a non-oxidizing atmosphere and a vacuum, wherein said first additive is selected from the group consisting of aluminum (Al), aluminum alloys, silicon (Si), and silicon alloys, wherein said second additive is selected from the group consisting of titanium (Ti), zirconium (Zr), niobium (Nb), boron (B), and rare earth elements, and wherein said flux contains at least one compound selected from the group consisting of oxides, silicates, carbonates, carbides and halides of alkali and alkaline earth metals and alumina ($Al_2O_3$);

(c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of magnesium; and (d) casting said molten alloy into a mold.

10. A method of producing an iron-, nickel-, and cobalt-base alloy having an oxygen content of less than 0.003%, a sulphur content of less than 0.010%, and a nitrogen content of less than 0.010%, comprising the steps of:

(a) charging a molten alloy in a container selected from the group consisting of a lime crucible, a lime crucible furnace, a converter and a ladle lined with a basic refractory consisting of 15–75% magnesium (MgO) and 15–85% calcium oxide (CaO), wherein said alloy consists essentially of at least one major ingredient selected from the group consisting of iron (Fe), nickel (Ni), and cobalt (Co);

(b) adding at least one additive and not more than 5% of a flux of melt into said molten alloy in an atmosphere selected from the group consisting of a non-oxidizing atmosphere and a vacuum, wherein said additive is selected from the group consisting of aluminum (Al), aluminum alloys, titanium (Ti), zirconium (Zr), niobium (Nb), boron (B), and rare earth elements, and wherein said flux contains at least one compound selected from the group consisting of oxides, silicates, carbonates, carbides and halides of alkali and alkaline earth metals;

(c) desulphurizing, deoxidizing and denitrifying said molten alloy in the presence of aluminum, calcium and magnesium under an atmosphere selected from the group consisting of a non-oxidizing atmosphere and a vacuum, whereby the molten alloy contains 0.005 to 7.0% of residual aluminum, 0.0001 to 0.005% of residual calcium, and 0.0005 to 0.005% of magnesium; and (d) casting said molten alloy into a mold.

11. A method as set forth in any of claims 1 through 10, wherein said non-oxidizing atmosphere is an argon gas atmosphere.

12. A method as set forth in any of claims 1 and 3, wherein said flux consists of calcium oxide and calcium fluoride ($CaF_2$).

13. A method as set forth in any of claims 2 and 10, wherein said flux consists of calcium oxide, calcium fluoride, and aluminum oxide.

14. A method as set forth in claim 1, wherein the magnesium oxide (MgO) is contained in an amount of 15–50% by weight and the calcium oxide (CaO) is contained in an amount of 40–85% by weight.

15. A method as claimed in claim 14, wherein the non-oxidizing atmosphere is an argon gas atmosphere.

16. A method of producing an iron-, nickel-, and cobalt-base alloy having an oxygen content of less than 0.002%, a sulphur content of less than 0.002%, and a nitrogen content of less than 0.03%, comprising the steps of:

(a) holding a molten alloy in a container selected from the group consisting of a lime crucible, a lime crucible furnace, a converter and a ladle lined with a basic refractory consisting of 15–85% of calcium oxide (CaO), and 15–75% of magnesium oxide (MgO), wherein said alloy consists essentially of at least one major ingredient selected from the group consisting of iron (Fe), nickel (Ni), and cobalt (Co);

(b) adding at least one additive into said molten alloy in an atmosphere selected from the group consisting of a non-oxidizing atmosphere and a vacuum, wherein said additive is selected from the group consisting of aluminum (Al) and aluminum alloys;

(c) desulphurizing, deoxidizing and denitrifying said molten alloy in the presence of the aluminum or aluminum from the aluminum alloys, calcium derived from the calcium oxide and magnesium derived from the magnesium oxide under an atmosphere selected from the group consisting of a non-oxidizing atmosphere and a vacuum, whereby the molten alloy contains 0.005 to 7.0% of residual aluminum, 0.0001 to 0.02% of residual calcium, and 0.0005 to 0.03% of residual magnesium; and (d) casting said molten alloy into a mold.

* * * * *